UNITED STATES PATENT OFFICE.

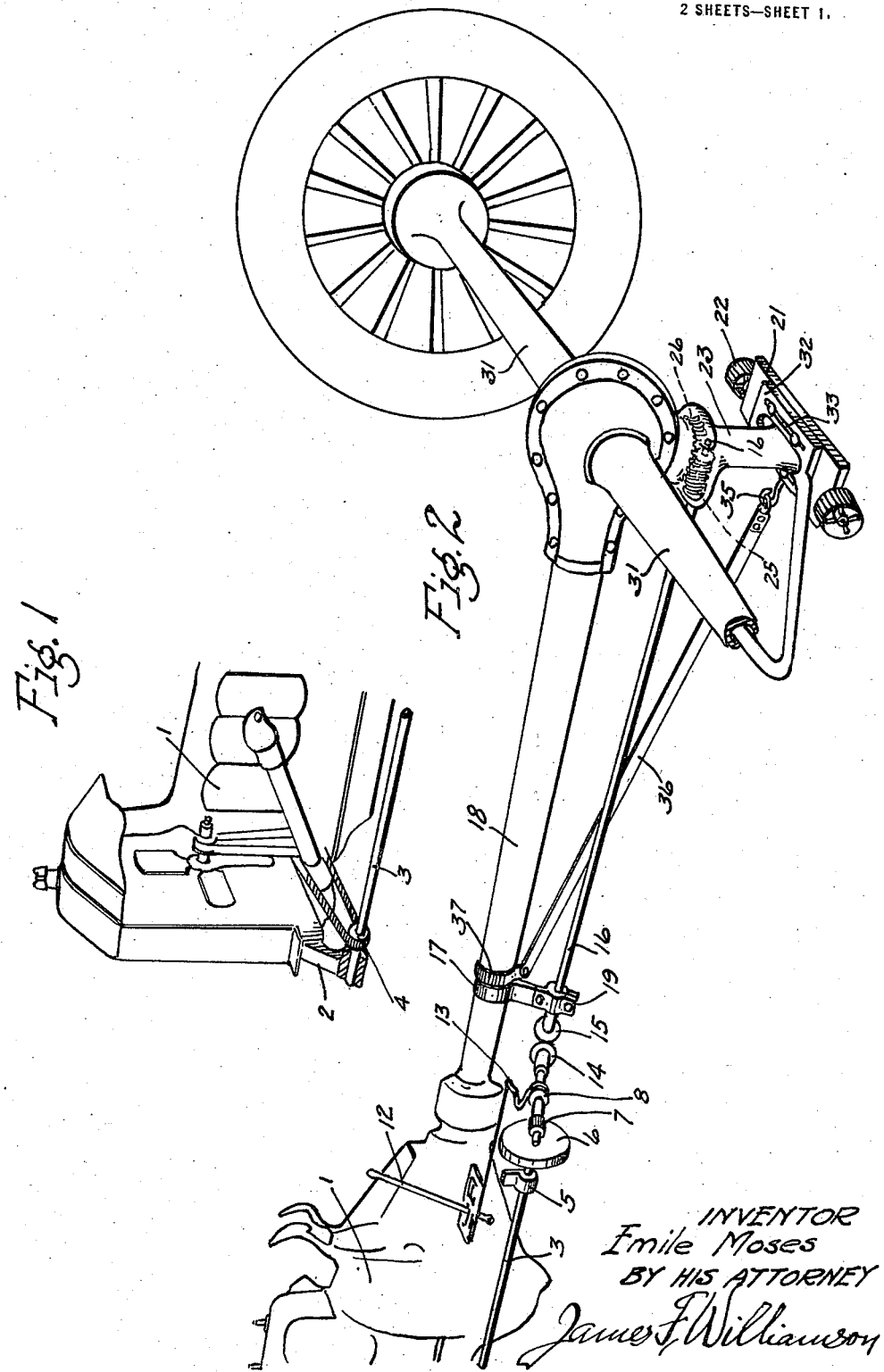

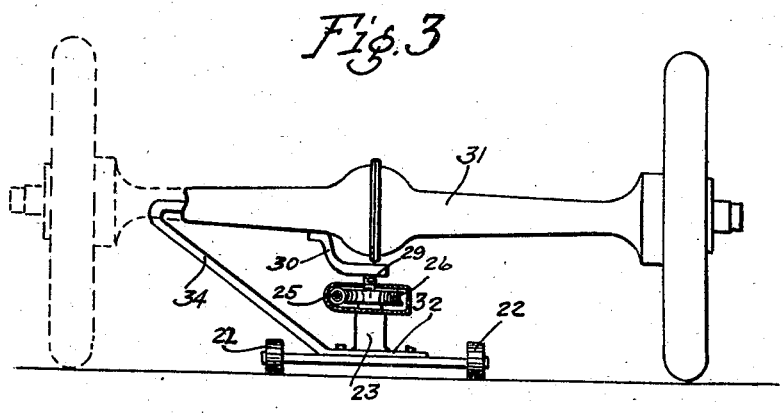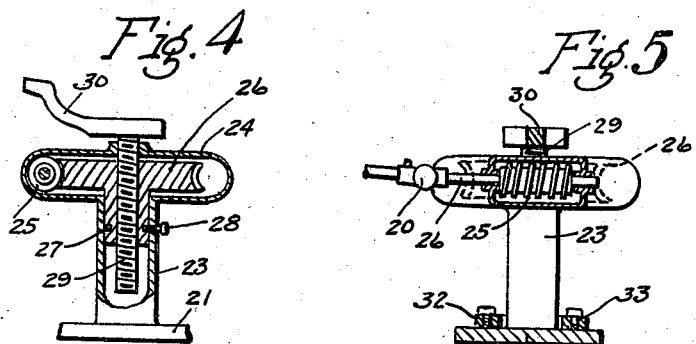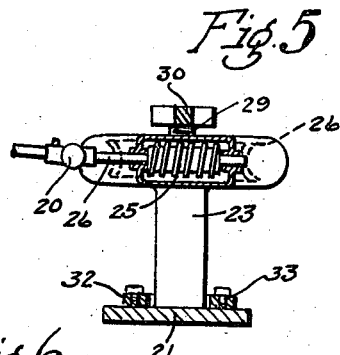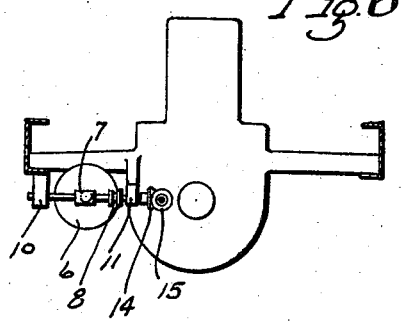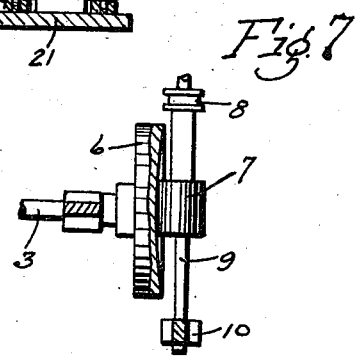

EMILE MOSES, OF MINNEAPOLIS, MINNESOTA.

POWER JACK FOR AUTOMOBILES.

1,416,736.  Specification of Letters Patent.  Patented May 23, 1922.

Application filed February 10, 1921. Serial No. 443,855.

*To all whom it may concern:*

Be it known that I, EMILE MOSES, a citizen of the United States, residing at Minneapolis, in the county of Hennepin and State of Minnesota, have invented certain new and useful Improvements in Power Jacks for Automobiles; and I do hereby declare the following to be a full, clear, and exact description of the invention, such as will enable others skilled in the art to which it appertains to make and use the same.

This invention relates to a power jack for automobiles and particularly to a jack which is designed to be actuated by power from the engine of the automobile.

It is an object of this invention to provide a power jack a part of the mechanism of which is permanently connected to the automobile and another part of which is detachable and adapted only to be used when the automobile is to be raised by means of the jack.

It is also an object of this invention to provide a jack operated by power from the engine of the automobile which power is controlled by a lever or other means located for convenient manipulation by a person in the driver's seat.

It is a further object of the invention to supply the jack with truck mechanism and supporting means for the end of one the axles of the automobile in case such axle should be broken.

These and other objects and advantages of the invention will be apparent from the following description made in connection with the accompanying drawings in which like reference characters refer to the same parts throughout the different views, and in which, Fig. 1 is a perspective view of the front part of an automobile showing the connection between the jack mechanism and the engine;

Fig. 2 is a perspective view in continuation of the jack in Fig. 1 and showing the parts of the power jack mechanism at the intermedate and rear portions of the automobile;

Fig. 3 is a rear view of the axle and wheels of an automobile with the jack applied thereto, one of the axles being represented as broken and supported by the jack means;

Fig. 4 is a fragmentary view showing the operating mechanism of the jack proper;

Fig. 5 is a view in elevation of the jack and the connecting shaft therefor;

Fig. 6 is a transverse sectional view of the frame of the automobile showing part of the jack operating mechanism;

Fig. 7 is a view partly in section of the acting clutch for the jack mechanism.

Referring to the drawings, Fig. 1 shows part of the hood and radiator casing of an automobile and also a portion of the engine casing 1. A bearing 2 is attached to the radiator casing or, if preferred, to the frame of the machine, and a shaft 3 has its end journalled therein. This shaft is provided with a small pulley 4 adapted to be driven by a belt from another pulley (not shown) connected to the crank shaft just in front of the pulley thereon which usually drives the radiator fan. Shaft 3 is supported far enough to the side of the machine so as not to interfere with the other parts and to clear the side of the engine casing 1 and this shaft is supported near its rear end by a bearing 5 adapted to be connected to the machine frame. The shaft 3 is arranged to be permanently connected to the automobile and carries at its rear end a disc member 6 forming one member of a friction clutch, the other member 7 of which comprises a small friction roller carried on a sleeve provided with a clutch collar 8 which sleeve is provided with a square aperture adapted to receive a square shaft 9, which is supported in spaced bearings 10 and 11 suitably secured to the frame of the machine and to the engine casing, respectively. A lever 12 is arranged to be pivoted at its lower end and extends upwardly through a slot in the floor or foot-board of the automobile so as to be in convenient relation for manipulation by the driver of the automobile. This lever is connected by suitable mechanism, designated generally as 13, to the clutch collar 8 so that when the lever is swung forwardly or rearwardly, the collar 8 and roller 7 will be moved on shaft 9 and roller 7 thus moved across the face of disc 6. It will be noted that the disc 6 is slightly concave on its friction face.

A shaft 9 adjacent to the bearing 11 is provided with a bevelled gear 14 and a similar gear 15 carried on the end of a shaft 16 is arranged to mesh therewith and to be driven thereby. The shaft 16 is supported immediately adjacent the rear of gear 15 by a bracket 17 clamped to the tortion tube 18 of the machine which bracket is provided with the cap member 19 secured thereto by suitable screws or bolts. The shaft 16 extends rearwardly of the machine and connects with the universal detachable joint 20 at its rear end.

The jack proper comprises a base member 21 which is provided with truck wheels 22 at each side thereof. A post 23 upstands from the base 21 and carries at its upper end casing 24 suitably constructed to form the enclosing casing for a worm gear 25 and a worm wheel gear 26. Worm gear 25 is provided with a shaft 26 supported in spaced bearings in the casing 24 and projecting therefrom at one end which end is adapted to be attached to the universal joint 20. The post 23 is formed with a cylindrical opening and worm wheel gear 26 has a depending post fitting therein and provided with a circumferential slot 27 into which the end of a set screw 28 extending through said post is adapted to engage. The worm wheel gear 26 is centrally bored and provided with threads to form a nut and a screw 29 is adapted to engage therewith which screw projects at its upper end through the casing 24 and is provided with a rest member 30 adapted to engage with the axle housing 31 of the automobile at either side of the central portion thereof which forms the transmission gear casing.

The base member 21 of the jack supports a slotted plate member 32, a slot of which embraces the post 23. This plate 32 is also provided with slot 33 through which and the base member 21 pass a plurality of securing bolts. With this construction it will be seen that the plate 32 can be adjusted laterally on plate 21 and secured in the desired adjusted position. Plate 21 carries at one side thereof an upwardly and laterally projecting arm 34, the upper end of which is inturned and adapted to take into the end of the axle casing. This end may also be, if desired, shaped to fit over the axle proper. The base member 21 is provided at its central front portion with a hook member 35 and a rod or bar 36 is provided at one end with an eyelet or ring adapted to detachably engage this hook and a shaft attached at its other end to a ring 37 adapted to be bolted and clamped to the tortion tube 18.

As above stated, the shaft 3 is adapted to be permanently secured to the machine as is also the shaft 9. The jack proper and the shaft 16 are adapted to be normally detached but can be securely brought into operative relationship to the attached parts by placing the shaft 16 in the bearing 17 by removing and replacing the cap 19. The bar 36 which is also normally detached can then be securely clamped to the tube 18 and engaged with the hook 35 of the jack. It will be seen that when the roller 7 is in the position shown in Fig. 7, the clutch formed thereby and by disc 6 will be in neutral position, the roller being just out of contact with the disc. If now the roller be shifted to one side or the other of the disc by means of lever 12, the said roller will be brought into firm and frictional engagement with the surface of the disc and will be driven thereby. It may be stated that the disc 6 is adapted to be continuously driven whenever the engine of the automobile is running. Power will be transmitted from shaft 9 to shaft 16 through gears 14 and 15 and from shaft 16 to the worm gear 25. This will in turn drive gear 26 and rotation of this gear will raise or lower screw 29 and rest 30 depending, of course, upon the direction of rotation. It will thus be seen that power from the engine will be transmitted to the jack to raise or lower the part to which the jack is applied.

It frequently happens that an axle is broken or a wheel is broken therefrom. The jack is therefore provided with the support 34 which can be applied to the broken end of an axle to support the side of the car and the car can then be run home using the jack as a truck. The truck wheels on the jack will also be useful in various places for moving the car when a part thereof is raised by the jack. The provision of bar 36 insures that the parts will be well braced and that the transmission of power will be certain and effective for operating the jack. The worm and worm wheel gear will also provide quiet and powerful means for operating the jack elevating screw.

It will, of course, be understood that various changes may be made in the form, details and arrangement of the parts without departing from the scope of applicant's invention which, generally stated, consists in the matter shown and described and set forth in the appended claims.

What is claimed is:

1. A power jack for an automobile comprising a shaft permanently connected to the frame of the machine and extending along the front side thereof, means for driving said shaft from the front end of the engine and a detachable shaft to be attached to the frame of the machine and be connected with said first mentioned shaft at one end, and a geared jack to which the last mentioned shaft is adapted to be connected at its other end.

2. A power jack for an automobile comprising a shaft permanently connected to the front end of the automobile frame, means for connecting the same to and driving the same from the front end of the engine, a second shaft extending transversely of the machine at an intermediate portion thereof, a variable speed clutch connecting the said two shafts a lever projecting through the foot-board in a convenient position for manipulation for the driver of the machine and connections from said lever to said clutch for moving the same to vary the speed of said second shaft.

3. A power jack for an automobile having in combination a shaft extending longitudinally of the machine at the front end thereof, means for driving said shaft from the front end of the engine, a friction disc carried at the rear end of said shaft having a friction roller supported for movement across the face of said disc so as to be in position to be driven in either direction or in neutral position and means in convenient relationship to the operator of the car for moving said roller across said disc.

4. A power jack for an automobile comprising a shaft extending longitudinally of the machine at the front portion thereof, means for driving said shaft from the front end of the engine, a shaft extending transversely of the machine at an intermediate portion thereof, a friction clutch connecting said two shafts, a shaft extending rearwardly from said second mentioned shaft and geared thereto, a jack comprising a nut formed as a worm wheel gear, a worm gear for driving the same and a universal joint for connecting the worm gear to the rear end of the last mentioned shaft.

5. A power jack for an automobile comprising a shaft extending longitudinally of one side of the machine frame at the front portion thereof, means for driving said shaft from the front end of the engine, a worm driven screw jack adapted to engage under the rear axle housing, a shaft connected to the worm gear thereof, transmission mechanism connecting said shaft to the first mentioned shaft and a brace bar secured to the torsion tube of the machine at one end and to said jack at the other end.

6. A power jack for an automobile comprising a shaft extending longitudinally of the machine formed at one side of the front portion thereof, means for driving said shaft from the front end of the engine, a second shaft driven from said first mentioned shaft and extending transversely of the machine frame and at an intermediate portion thereof, a gear on the end of said second shaft, a removable shaft having a gear on its front end adapted to mesh with said last mentioned gear, a bearing having a removable cap for supporting the front end of said last mentioned shaft, a jack and means for connecting the rear end of said last mentioned shaft to said jack.

7. A power jack for automobiles having in combination a base member, truck wheels journalled at each side thereof, a member supported upon said base member and arranged to be adjustably secured thereto and a laterally and upwardly extending arm secured to said member, said arm having an inturned end adapted to support the end of a broken axle or axle housing.

8. A power jack for an automobile having in combination a gear operated jack, transmission mechanism for raising or lowering said jack comprising a clutch member and means disposed in convenient reach of the driver for operating said clutch to bring the same into neutral position or in position to raise or lower said jack.

9. A power jack mechanism comprising a pair of shafts permanently carried by the automobile and a removable shaft adapted to be connected to a jack and to one of said pair of shafts.

10. A power jack mechanism comprising power transmission mechanism, a jack, a clutch connecting said jack and mechanism and means for moving said clutch to raise and lower the jack or to render the same inoperative.

In testimony whereof I affix my signature.

EMILE MOSES.